Dec. 22, 1936.  S. SILVERMAN  2,065,406

ORNAMENTED GLASS AND METHOD OF PRODUCING SAME

Filed May 17, 1935  2 Sheets-Sheet 1

Inventor:
SEBET SILVERMAN
Attorney

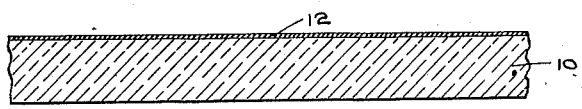
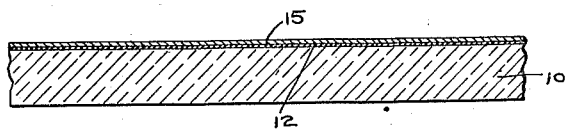
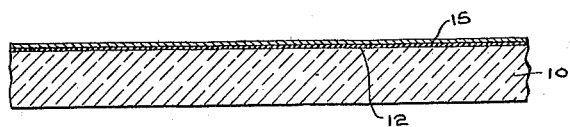
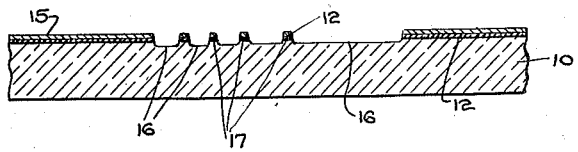
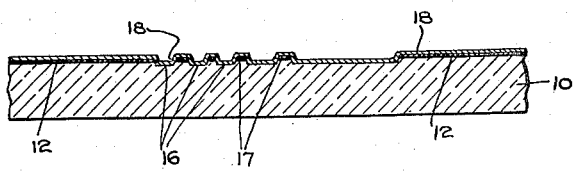
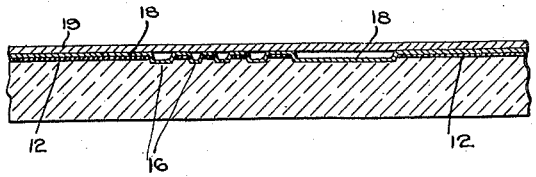

Patented Dec. 22, 1936

2,065,406

UNITED STATES PATENT OFFICE 2,065,406

ORNAMENTED GLASS AND METHOD OF PRODUCING SAME

Sebet Silverman, Philadelphia, Pa.

Application May 17, 1935, Serial No. 21,939

9 Claims. (Cl. 41—22)

This invention relates generally to the art of decoratively treating glass and other hyaline substances.

Among the principal objects of the present invention is to provide an inexpensive and yet highly practical and efficient method of decoratively treating a glass or other such transparent or translucent body whereby to produce a bas-relief effect in the smooth, untreated obverse surface of the glass.

Still another object is to produce a decorative glass object, such as an ornamented sign or the like, wherein the design is of a highly brilliant character and at the same time is provided with a bas-relief effect such as might be obtained only by modeling or contouring the obverse surface of the glass. In the product constructed and treated in accordance with the principles of the present invention, the glass is treated entirely upon its reverse surface to provide in its obverse surface a design of more brilliant and striking appearance than it has been possible to obtain heretofore and prior to this invention.

A still further object is to provide a method of contouring the reverse surface of glass or other hyaline substances whereby to produce therein areas of varying depths within which may be applied metal foil for enhancing the appearance of the contoured areas when viewed from the untreated, obverse surface of the glass and in consequence of which the contrasting lights and shadows of the design as composed of the contoured areas are rendered highly effective to produce the desired bas-relief effect.

Further objects of the invention and advantages resulting from the practice thereof will be apparent more fully hereinafter.

The invention consists substantially in the combination, construction, location and relative arrangement of the elements composing the completed product, as well as in the method of producing the same, all as will appear more fully hereinafter, as shown in the accompanying drawings and as finally pointed out in the appended claims.

In the said accompanying drawings which illustrate and exemplify one embodiment of the present invention:—

Figures 4 to 9, inclusive, are sectional views showing the plate in various successive stages of completion.

The present invention is, of course, not limited only to the production of decorative glass bodies of sheet or plate form but instead may be employed to produce decorative or ornamental designs in variously shaped bodies of glass or other such hyaline substances. In general, in order to produce the desired bas-relief effect, the reverse surface of the glass body is roughened and then coated or covered with a varnish paint, lacquer or any pigmented composition, which latter, when thoroughly dried, is in turn covered with a sheet or film of a suitable material adapted to resist the effects of sand-blasting. Certain designated areas or portions of this resisting material are then cut out and removed in such manner as to expose the painted surface, which latter is then sand blasted to a suitable depth or depths throughout the exposed area in such manner as to obtain an effect of modeling or contouring throughout the sand-blasted areas. Thereafter, the remaining resisting material is removed from the glass and the entire reverse surface thereof is coated with a suitable varnish which may be of a clear or any other desired color which, when applied over the sand-blasted areas of the design, provides the latter with an effect of translucency.

Following this application of the varnish coating over the contoured areas of the design, a sheet of metal foil is spread over the entire reverse surface of the glass and manipulated so that it is in contact with the contoured surfaces of the sand-blasted areas of the design. If desired, the metal foil may be preformed or embossed before its application over the sand-blasted surface of the glass body so that the raised protuberances thereof may be fitted within corresponding depressions formed in the sand-blasted design. As will be described hereinafter, various effects in the finished product may be obtained by the use of such preformed or embossed metal foils. Following the application of the metal foil over the contoured areas of the design in the glass body, the entire rear surface of the product is preferably coated with a suitable material to render the same impervious to moisture and other deteriorating influences.

Figure 3:
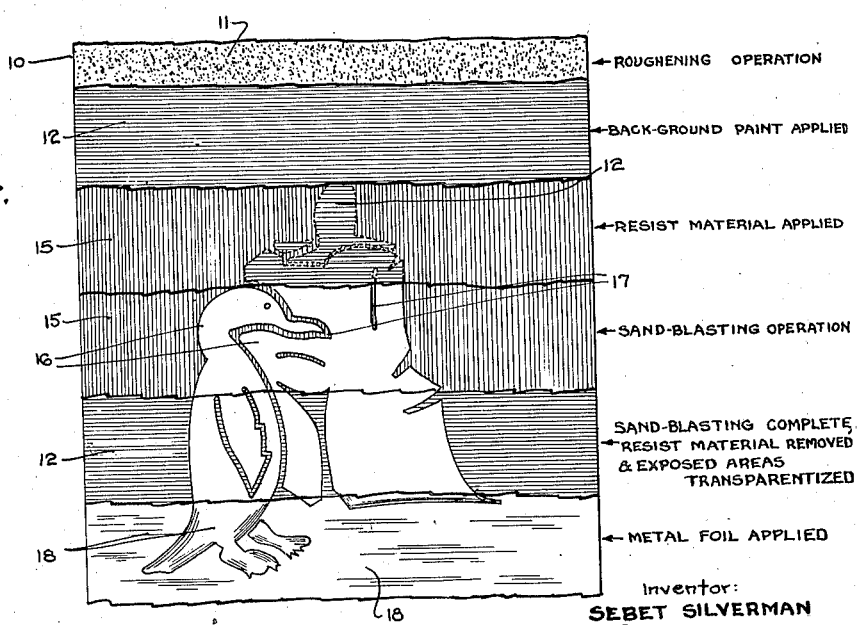
Figure 3 is a plan view of the reverse side of the plate shown in Figure 1 illustrating the successive steps employed in the production of the completed object.

Referring now to the drawings and more particularly to Figures 3 et seq., it will be observed that as the first step in the process of decoratively treating the glass body 10, its rear or reverse surface is uniformly sand blasted or otherwise prepared to provide a roughened surface 11. While this initial step of roughening the reverse surface of the glass is deemed by me to be desirable, it is not an indispensable one and in certain cases may be omitted. Over the roughened surface 11 of the glass body is then applied one or more coats or films of varnish paint or lacquer or pigmented composition 12 which may be of any desired color, the coating or covering so applied being sufficient to produce an opaque film which serves as the background 13 for the design 14 when the latter is viewed through the obverse surface of the glass body. The coating or covering 12 may be applied to the glass surface in any suitable manner, as by brushing, spraying, screening or otherwise, and regardless of the manner of its application, the said coating may be fired or baked into the surface of the glass. After the opaque painted coating 12 is completely and thoroughly dried, it is covered in its entirety with a film or sheet of a suitable rubber-like material 15 of a character well-known in the art as having the capacity to resist the effects of sand-blasting. This material is generally known in the art as "sand-blast resist material".

Figure 1:
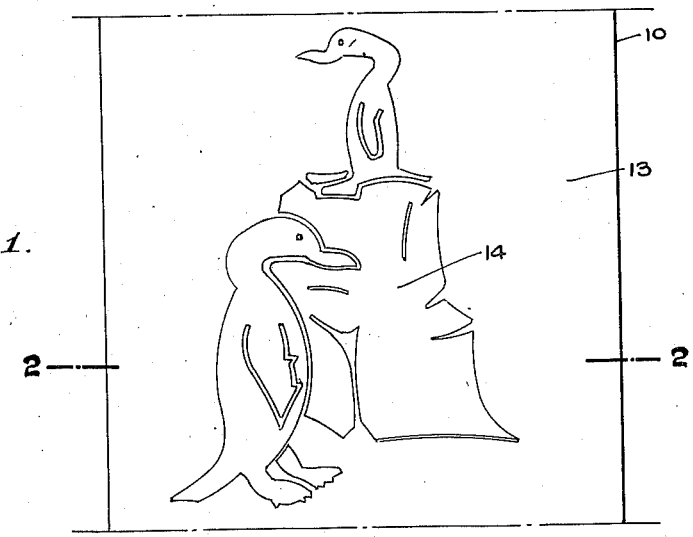
Figure 1 is a plan view of the obverse face of a glass plate constructed and treated in accordance with and embodying the principles of the present invention.
Figure 2:
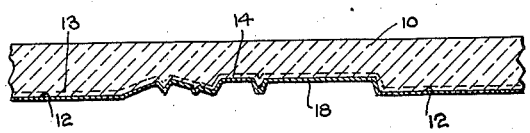
Figure 2 is a sectional view taken on the line 2—2 of Figure 1.

Traced upon the surface of the resist material 15 is the pattern of the particular design or configuration which it is desired to produce in the glass body. This design is shown in Figure 1, while the traced outline thereof as it originally appears upon the resist material is partially shown in the dotted lines of Figure 3. The resist material within the confines of the traced outline of the design is then cut out and removed, thereby exposing the opaque painted area 12. It will be understood, of course, that only those portions or areas of the design which are to be sand-blasted are exposed by the removal of the resist material 15. If desired, the resist material may be precut or stenciled or preliminarily prepared prior to its application to the coated surface of the glass so as to expose the portions of the design which are to be sand-blasted. Following the removal of the resist material as just described within the outlines of the pattern or design to be produced in the glass body, the reverse surface of the latter is subjected to a sand-blasting operation by which the design areas in the glass body are contoured or modeled to provide varying-depth elevations or depressions within the confines of the pattern outline. Such depressions are designated generally by the reference numeral 16 while the elevations are designated generally by the reference numeral 17 in Figures 3, 7, 8, and 9. The resist material 15 which surrounds the cut-out portion thereof, of course, resists the action of the sand-blasting operation and protects the surface of the glass during the said operation of sand-blasting, and at the same time insures that the marginal edges of the sand-blasted areas are sharply and clearly defined.

Following the sand-blasting operation, the resisting material 15 is entirely removed, thus exposing an opaque painted surface 12 which surrounds and affords a marginal background for the contoured design. Upon the removal of this resist material, the entire blasted design surface of the glass body is coated with varnish or other such material of any desired color, the varnish coating so applied being of a depth sufficient to insure a transparent or highly translucent condition of the glass within the sand-blasted or contoured areas of the design. At this stage of the completion of the product, it will be apparent that while the contoured or sand-blasted areas of the design are translucent or transparent to light rays passing through the glass body, the remaining portions of the body are opaque by virtue of the opaque paint coating 12.

Following the application of the varnish film over the contoured area or areas of the sand blasted design and the subsequent thorough drying thereof, a sheet of any suitable metal foil is spread over the reverse surface of the glass body to entirely cover the sand-blasted area thereof. This metal foil, which is designated by the reference numeral 18, is forced into the depressions of the sand-blasted design by means of a brush or soft rubber roller, the foil being thus forced more or less into intimate contact with the contoured surface of the design. If desired, instead of pressing the foil into contact with the contoured surfaces of the sand-blasted area in the manner just described, the foil may be preformed or embossed before its application to the glass body. In other words, a sheet of metal foil may be modeled to provide a bas-relief surface therein the raised projections and depressed portions of which are adapted respectively to fit within and over corresponding depressions and elevations formed in the sand-blasted areas of the design. Also, if desired and in order to produce different effects although employing identical sand-blasted design areas, the metal foil may be preformed or embossed to snugly and intimately fit within and against the contoured depressions and elevations in the sand-blasted areas of the glass body, or the metal foil may be preformed in such manner that the relief elements do not snugly fit within and intimately contact the surfaces of the corresponding contoured elements of the sand-blasted areas in the design, but instead may be provided with depressions and elevations of more rounded form than those provided in the contoured design of the glass body. I have found that by changing the character of the embossing of the metal foil entirely different effects may be obtained in the completed product even though exactly the same design outline and internal contouring of the design in the glass body is employed.

Any suitable adhesive material, preferably of a colorless transparent material such as clear varnish may be employed for adhesively securing the foil against the rear surface of the glass body. Preferably, the metal foil extends marginally beyond the outlines of the design so that the said adhesive material may be employed between the said marginal portions of the metal foil and the marginal portions of the glass body which surround the design area. Instead of employing an adhesive material, such as varnish, between the contacting surfaces of the glass body and the metal foil, the latter may be held in place against the glass body by any suitable mechanical means, such as adhesive tape or by a backing of glass or any other relatively rigid material secured to the glass body 10 in any suitable manner. Preferably, the entire reverse surface of the product constructed and treated as described hereinbefore may be protected against the atmosphere and other deleterious influences by a film or coating of waterproofing material applied in the form of a paint, paste or sheet of solid material, such as tar paper or the like. If a sheet of solid material is employed as the waterproofing medium, it is preferably secured to the reverse surface of the glass body 10 by means of a waterproof tape or the like (not shown), the marginal edges of the product so backed with the solid sheet of material being sealed in any suitable manner to afford complete protection against the entry of moisture or the like between the foil and the glass surface of the body 10.

I have stated above that the marginal surface which surrounds the design 14 and which affords a marginal background therefor is preferably rendered opaque by the application of a suitable opaque paint over the surface of the glass body. It will be understood, of course, that it is not essential that this marginal area surrounding the design be opaque because it may be somewhat translucent without detracting from the general appearance of the completed product. Whether or not said marginal areas, when viewed from the obverse surface of the glass body 10, are to be opaque or translucent, depends entirely upon the character of the product which is intended to be obtained.

It will be appreciated that the foil, which is employed to render the design highly brilliant and striking in appearance, may be of any desired metal. Moreover, the foil may be of any desired color so as to provide a wide range of color contrasts between the body of the design and the background therefor. Also, it may be pointed out that while metallic foil is the most desirable medium with which to back the contoured design, I do not contemplate limiting my present invention to the use of a backing of metallic foil. Instead, other materials having relatively high reflecting surface characteristics may be employed, particularly in those instances where the reflecting backing for the contoured areas of the design are preformed or embossed or otherwise initially prepared to provide a bas-relief effect in the surface thereof prior to its application to the glass body 10.

I have found in certain instances that it is not necessary to remove the resist material following the sand-blasting operation and prior to the application of the metal foil, and in some cases the resist material, when not removed, may itself serve as the opaque background for the design or may assist in rendering opaque a coating composition which would otherwise be too translucent.

It will be appreciated, of course, that the present invention is applicable to mirrors as well as to hyaline bodies in general, and in the event that it is desired to decoratively ornament mirrors, the method employed for effecting this differs from that hereinbefore described only as respects the application of the initial coating to the reverse surface of the glass, which in the case of mirrors, may be in the form of a film or coating of silver, gold, copper or any other suitable reflecting material. This reflecting film, which is deposited or otherwise applied to the surface of the glass in accordance with any of several well known methods, may be in lieu of the initial paint coating above referred to or it may be applied prior and in addition to the said paint coating.

It will be understood, therefore, that the invention is susceptible of various changes and modifications from time to time without departing from the real spirit or general principles thereof and it is accordingly intended to claim the same broadly, as well as specifically, as indicated in the appended claims.

What is claimed as new and useful is:

1. A method of decoratively treating a hyaline body which consists in contouring the reverse surface of said body to provide a design therein having varying depth elevations and depressions, in forming a reflecting backing with a contoured obverse surface to provide a design corresponding to that formed in the said hyaline body, and in applying the said reflecting body to the said hyaline body so that the contoured design in the obverse surface thereof nests within the similarly contoured design in the reverse surface of the said hyaline body.

2. A method of decoratively treating a hyaline body which consists in applying a coating of opaque or translucent material over the reverse surface of the said body, in applying a sand-blast resist material over the said coating, in removing certain portions of said resist material to expose in the form of a predetermined design the said underlying coating, in sand-blasting the reverse surface of said body whereby to contour the said design to provide varying-depth depressions and elevations therein, and in applying in substantially intimate surface contact over the contoured surface of the said design a contoured metallic film capable of being self-sustaining in shape.

3. A method of decoratively treating a hyaline body which consists in applying a coating of opaque or translucent material over the reverse surface of the said body, in applying a sand-blast resist material over the said coating, in removing certain portions of said resist material to expose in the form of a predetermined design the said underlying coating, in sand-blasting the reverse surface of said body whereby to contour the said design to provide varying-depth depressions and elevations therein, in applying in substantially intimate surface contact over the contoured surface of said design a correspondingly contoured metallic film capable of being self-sustaining in shape, and in applying a weatherproofing backing over the entire rear surface of the said hyaline body.

4. A method of decoratively ornamenting a glass mirror which consists in applying over the reflecting film thereof a coating of paint or other such opaque or translucent material, in simultaneously removing certain areas of said paint coating and portions of the glass body and reflecting film of the mirror confined within said areas to provide a surface-contoured design in said coated surface of the mirror, and in applying in substantially intimate surface contact over the exposed surfaces of the said surface-contoured design a correspondingly contoured opaque light-reflecting material in the form of a sheet having the property of being self-sustaining in shape.

5. A method of decoratively treating a hyaline body which consists in applying to the reverse surface thereof a back-ground-forming material, in sand-blasting the said reverse surface to carve a design of predetermined contour within the area of said back-ground-forming material, in transparentizing the sand blasted surface of the design by the application of a varnish coating thereto, and in applying over the said reverse surface of the hyaline body a metallic foil, certain portions of which are pressed into the depressions of the said design to provide a bas-relief effect in the design when the same is viewed through the obverse surface of the hyaline body.

6. A method of decoratively treating a hyaline body which consists in applying a coating of back-ground material over the reverse surface thereof, in applying a sand blast resist material over the said coating, in removing certain portions of said resist material to expose the said underlying coating in the form of a predetermined pattern, in sand blasting the reverse surface of said body within the outline of said pattern to carve in said body a design of predetermined contour, and in transparentizing the sand blasted surface of the carved design by the application of a varnish coating thereto to render the carved area of the hyaline body capable of transmitting light rays therethrough.

7. A method of decoratively treating a hyaline body which consists in applying a coating of opaque material over the reverse surface thereof, in applying a sand-blast resist material over the said coating, in removing certain portions of said resist material to expose the said underlying coating in the form of a predetermined pattern, in sand blasting the reverse surface of said body to carve therein a design of varying contour within the outline of said predetermined pattern, in transparentizing the sand blasted surface by the application of a varnish coating thereto, and in applying over the contoured surface of the carved design a malleable film of reflecting material, certain portions of which are pressed into the depressions of the carved design whereby to produce a finished design which, when viewed from the obverse surface of the hyaline body, is a composite of the contoured designs carved in the hyaline body and impressed in the reflecting film.

8. In combination, a hyaline body the reverse face of which is provided with a sand-blast-carved design of predetermined outline and contour, a film of transparentizing material overlying the surface of the design to render that portion of the body confined within the outline of the design transmissible to light rays, and a sheet of reflecting material overlying the transparentized surface of said carved design and having portions pressed to conform with the contour of said design to provide a bas-relief effect when the design is viewed through the obverse surface of said body.

9. As an article of manufacture, a transparent body the rear surface of which is sand-blast-contoured to provide a carved design therein of predetermined outline and contour, a transparentizing medium applied to the sand-blasted surface of the design to render the sand-blasted portion of the body transmissible of light rays, a coating of opaque material applied over all of the rear surface of the body except for the sand blasted areas thereof, and a reflecting material in the form of a sheet self-sustaining in shape applied over the coated surface of the body and having portions thereof pressed into the depressions of the carved design, said pressed-in portions being so shaped and impressed as to present a modified composite design when viewed through the front surface of the body which differs in detail and appearance from the individual designs respectively formed in the transparent body and in the reflecting material.

SEBET SILVERMAN.

Patent No. 2,065,406 Granted December 22, 1936

SEBET SILVERMAN

The above entitled patent was extended April 24, 1951, under the provisions of the act of June 30, 1950, for 3 years and 320 days from the expiration of the original term thereof.

*Commissioner of Patents.*